(12) United States Patent
Wakisaka et al.

(10) Patent No.: US 8,181,473 B2
(45) Date of Patent: May 22, 2012

(54) REFRIGERATION CYCLE DEVICE, AND AIR CONDITIONER FOR VEHICLE

(75) Inventors: Takeshi Wakisaka, Ichinomiya (JP);
Satohisa Yoshida, Anjo (JP); Yoshihiro Furumoto, Anjo (JP); Yasuaki Akabane, Tokyo (JP)

(73) Assignee: Denso Corporation, Kariya (JP)

( * ) Notice: Subject to any disclaimer, the term of this patent is extended or adjusted under 35 U.S.C. 154(b) by 735 days.

(21) Appl. No.: 12/315,275

(22) Filed: Dec. 2, 2008

(65) Prior Publication Data

US 2009/0145146 A1 Jun. 11, 2009

(30) Foreign Application Priority Data

Dec. 3, 2007 (JP) ................................. 2007-312421

(51) Int. Cl.
F25B 1/00 (2006.01)
F04B 49/02 (2006.01)
(52) U.S. Cl. .......... 62/230; 62/226; 62/228.3; 62/228.4; 62/228.5
(58) Field of Classification Search .................... 62/226, 62/228.3, 228.4, 228.5, 230; 417/223, 319
See application file for complete search history.

(56) References Cited

U.S. PATENT DOCUMENTS

| 5,197,298 A | * | 3/1993 | Kobayashi et al. | ............. 62/115 |
| 6,098,412 A | * | 8/2000 | Porter et al. | .................... 62/126 |
| 2004/0050085 A1 | * | 3/2004 | Tanihata | ......................... 62/229 |

FOREIGN PATENT DOCUMENTS

| JP | 61-275017 | 12/1986 |
| JP | 07-232544 | 9/1995 |
| JP | 10-292858 | 11/1998 |

OTHER PUBLICATIONS

JP 402045220A (English Abstract Translation).*

* cited by examiner

Primary Examiner — Cheryl J Tyler
Assistant Examiner — Jonathan Bradford
(74) Attorney, Agent, or Firm — Harness, Dickey & Pierce, PLC (57) ABSTRACT

In a refrigeration cycle device in which a compressor is driven by power transmitted from an engine, a torque limiter is adapted to interrupt a transmission of the power from the engine to the compressor when a torque transmitted from the engine to the compressor becomes a predetermined value. A control unit is adapted to determine whether the transmission of the power from the engine to the compressor is interrupted by the torque limiter by determining whether a deviation of a refrigerant discharge pressure of the compressor is below a predetermined pressure when the control unit commands the compressor to change the refrigerant discharge flow amount of the compressor. Thus, the control unit can determine whether the torque limiter interrupts the transmission of power from the engine to the compressor without, using a compressor revolution sensor.

9 Claims, 5 Drawing Sheets

REFRIGERATION CYCLE DEVICE, AND AIR CONDITIONER FOR VEHICLE

CROSS REFERENCE TO RELATED APPLICATION

This application is based on Japanese Patent Application No. 2007-312421 filed on Dec. 3, 2007, the contents of which are incorporated herein by reference in its entirety.

FIELD OF THE INVENTION

The present invention relates to a refrigeration cycle device including a compressor driven by an engine, and an air conditioner for a vehicle using the same.

BACKGROUND OF THE INVENTION

Conventionally, some refrigeration cycle devices for vehicle air conditioners use a variable displacement compressor that compresses refrigerant by being driven by power transmitted from a vehicle engine via a drive belt. The variable displacement compressor can continuously change a refrigerant discharge capacity from 100% to about 0%.

In such a refrigeration cycle device, the discharge capacity of the compressor is decreased to about 0%, so that the compressor is brought substantially into an operation-stop state. Thus, the compressor has a clutch-less structure without using a clutch for interrupting a transmission route to the engine.

In this case, however, the drive belt may be broken by the power from the engine while the compressor is locked. Thus, a pulley has been proposed which includes a torque limiter for protecting the drive belt by interrupting the transmission of power from the engine to the compressor when a torque transmitted from the engine to the compressor reaches a predetermined value (see, for example, JP-A-10-292858).

A refrigeration cycle device is provided with an engine revolution sensor for detecting an engine speed, and a compressor revolution sensor for detecting the number of revolutions of a compressor, thereby to detect a locked state of the compressor based on a sensor signal from the engine rotation sensor and a sensor signal from the compressor rotation sensor (see, for example, JP-A-61-275017).

Another refrigeration cycle device is provided with a temperature sensor for detecting the temperature of a compressor body in addition to the above-described two revolution sensors so as to prevent incorrect determination due to a variation in number of revolutions of a compressor in an overload state caused by liquid compression or the like (see, for example, JP-A-7-232544). In this case, the locked state of the compressor is detected by using sensor signals from the two revolution sensors and the detected temperature of the compressor body.

The techniques as disclosed in the above-described JP-A-61-275017 and JP-A-7-232544, however, require not only the engine revolution sensor, but also the compressor revolution sensor so as to detect the locked state of the compressor. That is, the compressor revolution sensor which is not generally mounted on a vehicle is required in order to determine whether a torque limiter interrupts the transmission of power from the engine to the compressor.

SUMMARY OF THE INVENTION

The present invention has been made in view of the forgoing problems, and it is an object of the present invention to provide a refrigeration cycle device which can determine whether or not a torque limiter interrupts a transmission of power from an engine to a compressor without using a compressor revolution sensor or the like.

It is another object of the present invention to provide an air conditioner for a vehicle with a refrigeration cycle device, which can accurately determine whether or not a torque limiter interrupts a transmission of power from a vehicle engine to a compressor without using a compressor revolution sensor or the like.

According to an aspect of the present invention, a refrigeration cycle device includes a compressor configured to be driven by power transmitted from an engine so as to draw, compress, and discharge refrigerant, a refrigerant cooler configured to cool high-pressure refrigerant discharged from the compressor, a decompression device configured to decompress the refrigerant cooled by the refrigerant cooler, an evaporator configured to evaporate the refrigerant decompressed by the decompression device, a torque limiter adapted to interrupt a transmission of the power from the engine to the compressor when a torque transmitted from the engine to the compressor becomes a predetermined value, a command means for commanding the compressor to change a refrigerant discharge flow amount of the compressor, and a first limiter determination means. The first limiter determination means is adapted to determine whether the transmission of the power from the engine to the compressor is interrupted by the torque limiter by determining whether a deviation of a refrigerant discharge pressure of the compressor is below a predetermined pressure when the command means commands the compressor to change the refrigerant discharge flow amount of the compressor. Accordingly, the refrigeration cycle device can determine whether or not the torque limiter interrupts the transmission of power from the engine to the compressor, without using a compressor revolution sensor or the like.

For example, the refrigeration cycle device may be provided with a pressure detection portion that is configured to detect the refrigerant discharge pressure of the compressor. In this case, the first limiter determination means determines whether the deviation of the refrigerant discharge pressure of the compressor is below the predetermined pressure based on a detection pressure detected by the pressure detection portion.

The compressor may be a variable displacement compressor that is configured to be capable of changing a refrigerant discharge capacity and adapted to change the refrigerant discharge flow amount by changing the refrigerant discharge capacity. In this case, the command means may output a command signal to the variable displacement compressor, thereby commanding the compressor to change the refrigerant discharge capacity based on a duty ratio of the command signal. Alternatively, the command means may command the variable displacement compressor to switch the refrigerant discharge capacity of the compressor from one to the other of a first refrigerant discharge capacity and a second refrigerant discharge capacity which is below the first discharge capacity.

Furthermore, the refrigeration cycle device may be further provided with a calculation means for calculating and determining a maximum value of the detection pressure detected by the pressure detection portion obtained when the command means commands the compressor to set the first refrigerant discharge capacity as the refrigerant discharge capacity, and a minimum value of the detection pressure detected by the pressure detection portion when the command means commands the compressor to set the second refrigerant discharge capacity as the refrigerant discharge capacity. In this case, the calculation means is adapted to calculate a difference between the maximum value and the minimum value as the deviation of the refrigerant discharge pressure, and the first limiter determination means determines whether the deviation is below the predetermined pressure by using the deviation calculated by the calculation means.

Alternatively, the refrigeration cycle device may be further provided with: an evaporator temperature detection portion configured to detect a temperature of the refrigerant in the evaporator; capacity control means for controlling the refrigerant discharge capacity of the variable displacement compressor such that the detection temperature detected by the evaporator temperature detection portion approaches a target temperature; and second limiter determination means for determining whether the transmission of the power from the engine to the compressor is interrupted by the torque limiter by determining whether the detection pressure detected by the pressure detection portion is below the predetermined value after the capacity control means controls the compressor for a certain time such that the discharge capacity of the compressor is equal to or more than the predetermined capacity. In this case, only when the second limiter determination means determines that the transmission of the power from the engine to the compressor is interrupted by the torque limiter, the first limiter determination means is adapted to determine whether the transmission of the power from the engine to the compressor is interrupted by the torque limiter.

In the refrigeration cycle device, an evaporator temperature detection portion may be provided to detect a temperature of the refrigerant in the evaporator. In this case, the first limiter determination means is adapted to determine whether the deviation of the refrigerant discharge pressure of the compressor is below the predetermined value by determining whether a deviation of the detection temperature detected by the evaporator temperature detection portion is below a predetermined temperature when the command means commands the compressor to change the refrigerant discharge flow amount of the compressor. Alternatively, a torque estimating means for estimating a drive torque required for driving the compressor may be provided. In this case, the first limiter determination means is adapted to determine whether the deviation of the refrigerant discharge pressure of the compressor is below the predetermined value by determining whether the deviation of the drive torque estimated by the torque estimating means is below a predetermined torque when the command means commands the compressor to change the refrigerant discharge flow amount of the compressor. Alternatively, a flow amount sensor may be provided to detect the refrigerant discharge flow amount of the compressor. In this case, the first limiter determination means is adapted to determine whether the deviation of the refrigerant discharge pressure of the compressor is below the predetermined value by determining whether the flow amount detected by the flow amount sensor is below a predetermined flow amount when the command means commands the compressor to change the refrigerant discharge flow amount of the compressor.

According to another aspect of the present invention, an air conditioner for a vehicle includes the refrigeration cycle device. In this case, the compressor is driven by the engine for vehicle running. Generally, the air conditioner includes an air conditioning case being adapted to accommodate the evaporator of the refrigeration cycle device, and a blower configured to blow the air toward the evaporator in the air conditioning case.

For example, the air conditioner may be further provided with a warning portion configured to warn a passenger in the vehicle compartment, and a warning control means. In this case, the warning control means warns the passenger by operating the warning portion that the transmission of power from the engine to the compressor is interrupted by the torque limiter, when the first limiter determination means determines that the transmission of the power from the engine to the compressor is interrupted by the torque limiter.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Figure 1:
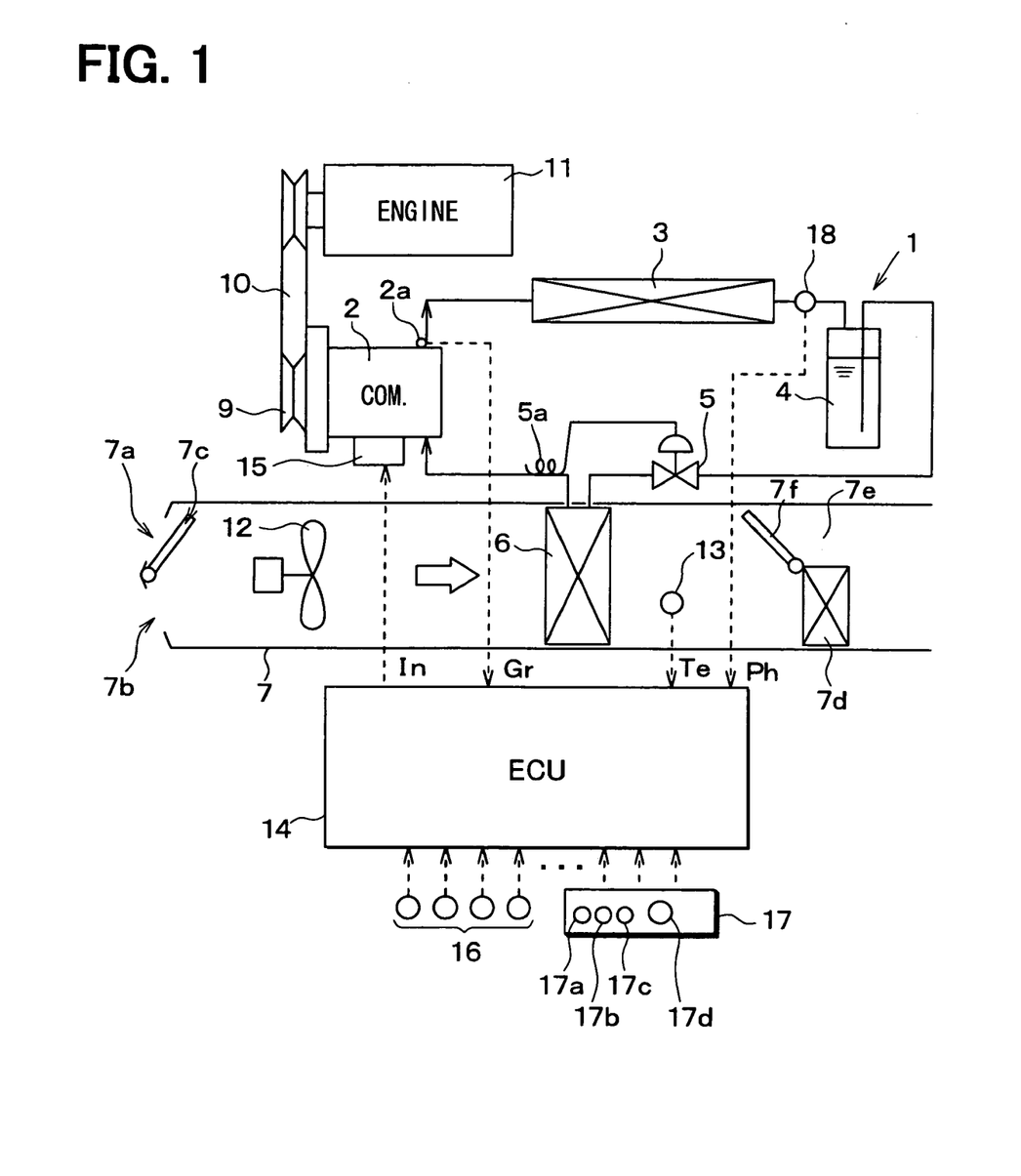
FIG. 1 is a schematic diagram showing an entire configuration of a refrigeration cycle device according to one embodiment of the present invention.

Now, an embodiment of the present invention will be described below referring to FIGS. 1 to 6. In the present embodiment, a refrigeration cycle device is typically used for a vehicle air conditioner 1 shown in FIG. 1. FIG. 1 is a schematic diagram showing an entire configuration of the air conditioner 1.

The air conditioner 1 includes a variable displacement compressor 2, a condenser 3, a gas-liquid separator 4, an expansion valve 5, and an evaporator 6.

The variable displacement compressor 2 is disposed in an engine room of the vehicle. The variable displacement compressor 2 has a known structure, and is configured to draw, compress, and discharge the refrigerant by power transmitted from an engine 11 for vehicle running via a pulley 9 and a belt 10. The variable displacement compressor 2 includes an electromagnetic control valve 15 for changing a refrigerant discharge capacity from about 0% to 100% based on a duty ratio of a command signal from an electronic control unit 14 (ECU) to be described later.

The command signal is a signal that has a constant frequency and in which a voltage applying time Ton for applying the voltage and a voltage-applying stop time Toff for stopping the applying of voltage are alternately set on a time axis. The duty ratio of the command signal having the constant frequency indicates a ratio (=Ton/(Ton+Toff)) of the voltage applying time Ton per unit time (Ton+Toff). Thus, the electromagnetic control valve 15 is operated so as to cause an actual refrigerant discharge capacity to be approached to a command value corresponding to the duty ratio.

The pulley 9 is configured to be used as a torque limiter for interrupting the transmission of power from the engine 11 to the variable displacement compressor 2 when a torque from the engine 11 reaches a predetermined value. The torque limiter is a well known structure, for example, as disclosed in the above-described JP-A-10-292858, and thus a specific description thereof will be omitted.

The condenser 3 is disposed in the engine room. The condenser 3 is a cooler configured to cool the refrigerant by exchanging heat between the refrigerant discharged from the variable displacement compressor 2 and outside air blown by a blower fan (not shown). The gas-liquid separator 4 is adapted to separate the refrigerant cooled by the condenser 3 into a gas-phase refrigerant and a liquid-phase refrigerant.

The expansion valve 5 is a decompression device configured to decompress and expand the separated liquid-phase refrigerant flowing from the gas-liquid separator 4, and to adjust a flow amount of refrigerant flowing from a refrigerant outlet side of the expansion valve 5.

Specifically, the expansion valve 5 includes a temperature sensing cylinder 5a for detecting the refrigerant temperature between a refrigerant suction side of the variable displacement compressor 2 and a refrigerant outlet side of the evaporator 6. The expansion valve 5 detects a superheat degree of the refrigerant on the refrigerant suction side of the variable displacement compressor 2 based on the temperature and pressure of the refrigerant drawn into the variable displacement compressor 2, and adjusts an opening degree of its valve such that the superheat degree becomes a predetermined value.

The evaporator 6 is disposed in an air conditioning case 7 of an indoor air conditioning unit of the vehicle air conditioner. The evaporator 6 is a heat exchanger for cooling the air blown from a blower fan 12 by exchanging heat between the refrigerant decompressed and expanded by the expansion valve 5 and the air blown from the blower fan 12. Therefore, the air passing through the evaporator 6 is cooled by absorbing heat from the evaporation latent heat in the evaporator 6.

The air conditioning case 7 is provided with an inside air introduction port 7a, an outside air introduction port 7b, and an inside/outside air switching door 7c for selectively opening and closing the inside air port 7a and the outside air port 7b. At least one of the inside air introduced from the inside air introduction port 7a and the outside air introduced from the outside air introduction port 7b is blown out toward the evaporator 6 by the blower fan 12.

The blown air passes through the evaporator 6 to be cooled. A part of cool air cooled in the evaporator 6 flows into a heater unit 7d. The remaining cool air having passed through the evaporator 6 flows into a bypass passage 7e. The air passing through the bypass passage 7e and the air passing through the heater unit 7d are mixed so that conditioned air having a desired temperature can be blown out from an outlet into a vehicle compartment.

An air mix door 7f is disposed on an upstream air side of the heater unit 7d, and adjusts a ratio of the flow amount of air flowing from the evaporator 6 to the heater unit 7d and the flow amount of air flowing from the evaporator 6 to the bypass passage 7e, thereby adjusting the temperature of air blown from the outlet into the vehicle compartment. The doors 7c and 7f are driven by respective servo motors (not shown), for example.

Now, an electric control configuration of the air conditioner 1 for a vehicle in the present embodiment will be described below.

The electronic control unit 14 (ECU) is constructed of a known microcomputer and the like, including a plurality of CPUs, ROMs, RAMs, timers, and the like. The reason why the microcomputer includes the plurality of CPUs is that computer programs are executed in parallel as will be described later.

The electronic control unit 14 executes the computer program pre-stored in the ROM based on output signals from an evaporator temperature sensor 13, a high-pressure refrigerant sensor 18, a flow amount sensor 2a, a group of sensors 16 for air conditioning, and a group of operation switches of the air conditioning operation panel 17, thereby controlling an electric motor of the blower fan 12, the electromagnetic control valve 15, and servo motors of the doors 7a and 7f and the like.

The evaporator temperature sensor 13 is provided at a position directly after an air outlet portion of the evaporator 6, in the air conditioning case 7. The evaporator temperature sensor 13 is configured to detect an air outlet temperature directly after the air passes through the evaporator 6, so as to detect the refrigerant temperature in the evaporator 13. The air temperature immediately after the air passes through the evaporator 6 is an example of an evaporator temperature Te.

The high-pressure refrigerant sensor 18 is provided in a high pressure refrigerant passage that is positioned on a refrigerant downstream side of the variable displacement compressor 2 and on a refrigerant upstream side of the expansion valve 5. The high-pressure refrigerant sensor 18 detects a refrigerant pressure in the high pressure refrigerant passage on a high-pressure side before being decompressed. Here, the refrigerant pressure in the high pressure refrigerant passage is referred to as a "refrigerant discharge pressure Ph". The high-pressure refrigerant sensor 18 of the present embodiment is disposed on a refrigerant outlet side of the condenser 3, as an example. The flow amount sensor 2a is provided on the refrigerant outlet side of the variable displacement compressor 2 to detect a flow amount of discharged refrigerant from the compressor 2.

The group of sensors 16 for air conditioning include an outside air sensor for detecting an outside air temperature Tam, an inside air sensor for detecting an inside air temperature Tr within the vehicle compartment, and a solar radiation sensor for detecting an amount of solar radiation Ts entering the inside of the vehicle compartment.

The group of air conditioning operation switches on the air conditioning operation panel 17 include an A/C switch 17a for outputting an operation command signal of the variable displacement compressor 2, an air outlet mode switch 17b for setting an air outlet mode, and a temperature setting switch 17c for setting the temperature of an inside of the vehicle compartment. The air conditioning operation panel 17 is provided with a warning lamp 17d made of a light-emitting diode and the like.

Now, the specific control processing of the electronic control unit 14 of the present embodiment will be described below.

The electronic control unit 14 executes refrigerant discharge-capacity control processing and torque-limiter operation determination processing, in parallel. When an A/C switch flag in the memory is set, the refrigerant discharge-capacity control processing and the torque-limiter operation determination processing are repeatedly performed. The A/C switch flag is set when an A/C switch 17a is turned on.

The refrigerant discharge-capacity control processing and the torque-limiter operation determination processing are respectively described below.

(Refrigerant Discharge-Capacity Control Processing)

Figure 2:
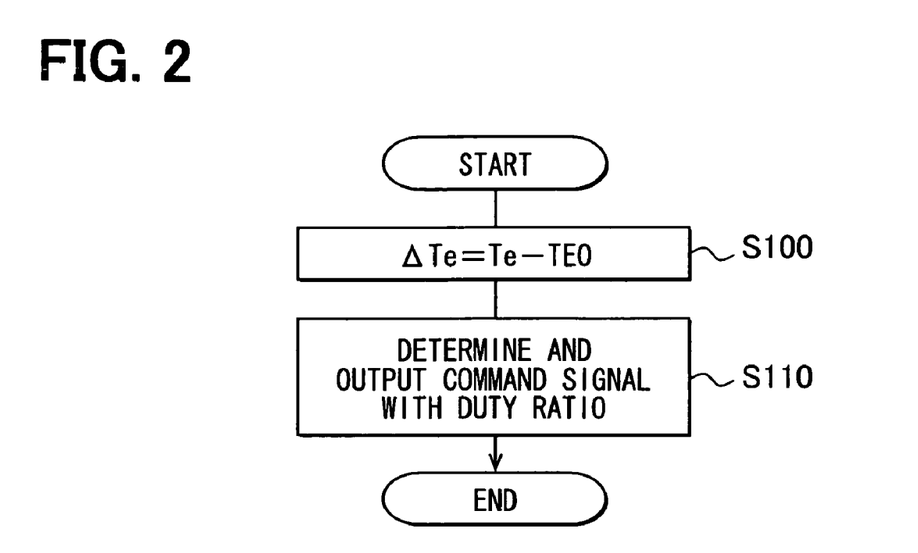
FIG. 2 is a flowchart showing a part of control processing performed by an electronic control unit (ECU) shown in FIG. 1.

The electronic control unit 14 executes the computer program for the refrigerant discharge-capacity control processing according to the flowchart shown in FIG. 2.

At step S100, a temperature difference $\Delta Te$ ($=Te-TEO$) between an evaporator temperature Te and the target temperature TEO is determined. In next step S110, a command value of the refrigerant discharge amount, that is, a duty ratio of a command signal is determined such that the temperature difference ΔTe (=Te−TEO) approaches zero. The command signal with the duty ratio determined is output to the electromagnetic control valve 15 of the variable displacement compressor 2.

Then, the electromagnetic control valve 15 increases or decreases the refrigerant discharge capacity of the compressor 2 such that the temperature difference ΔTe (=Te−TEO) approaches zero. In this way, the duty ratio of the command signal is determined such that the temperature difference ΔTe approaches zero, and the command processing to the variable displacement compressor 2 is repeated such that an actual refrigerant discharge capacity of the compressor 2 approaches the command value corresponding to the duty ratio.

The variable displacement compressor 2 increases the flow amount of discharged refrigerant with increasing discharge capacity. In contrast, the variable displacement compressor 2 decreases the flow amount of discharged refrigerant with decreasing discharge capacity. The refrigerant discharge flow amount is controlled based on the duty ratio (that is, the command value of the refrigerant discharge capacity). Then, the refrigerant discharged from the variable displacement compressor 2 flows and circulates through the condenser 3, the gas-liquid separator 4, the expansion valve 5, the evaporator 6, and the variable displacement compressor 2 in that order, so that the evaporator temperature Te approaches the target temperature TEO.

(Torque-Limiter Operation Determination Processing)

Now, the torque-limiter operation determination processing will be described below.

Figure 3:
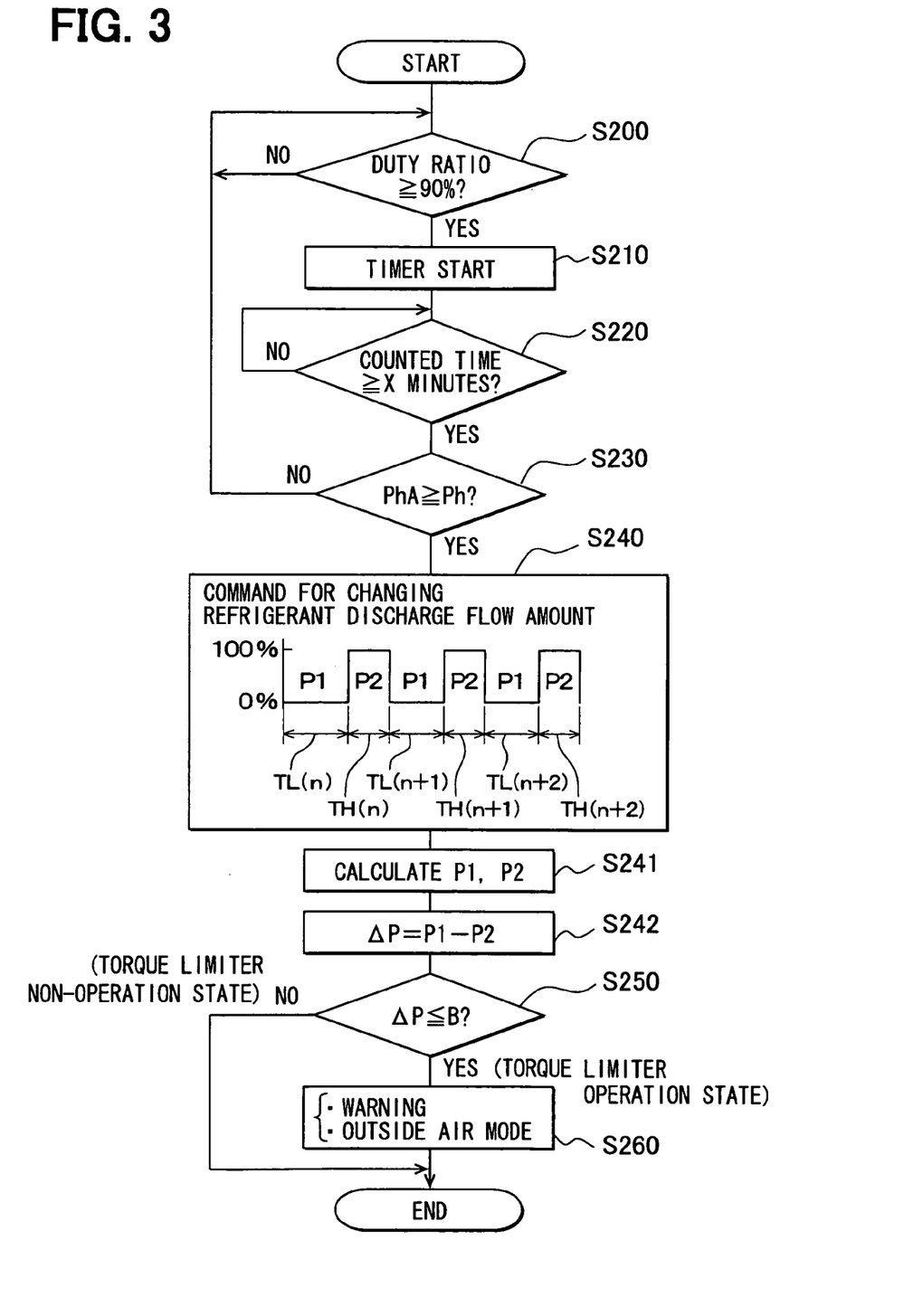
FIG. 3 is a flowchart showing another part of the control processing performed by the electronic control unit (ECU) shown in FIG. 1.
Figure 5A:
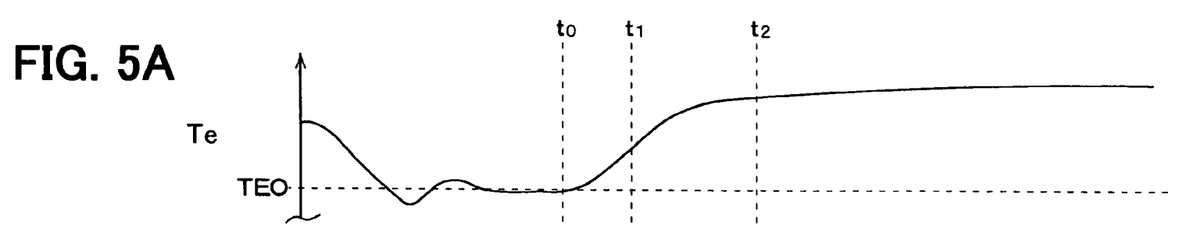
FIGS. 5A, 5B and 5C are timing charts showing variations in an evaporator temperature (Te), an output duty ratio, and a refrigerant discharge pressure (Ph), for explaining an operating state of the refrigeration cycle device shown in FIG. 1.
Figure 5B:
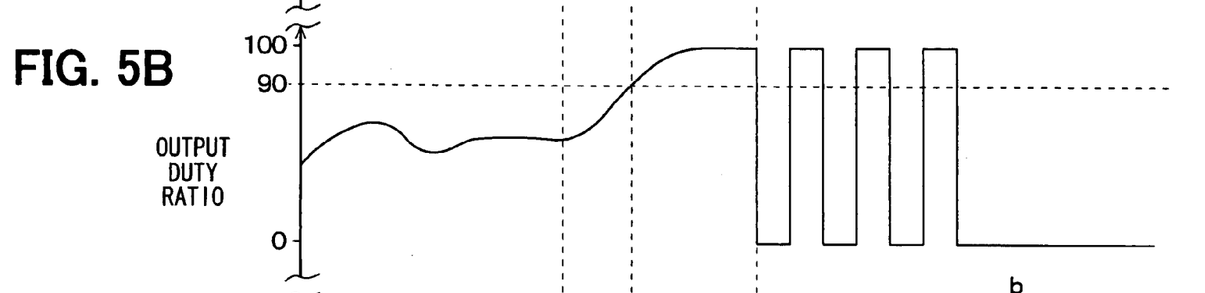
Figure 5C:
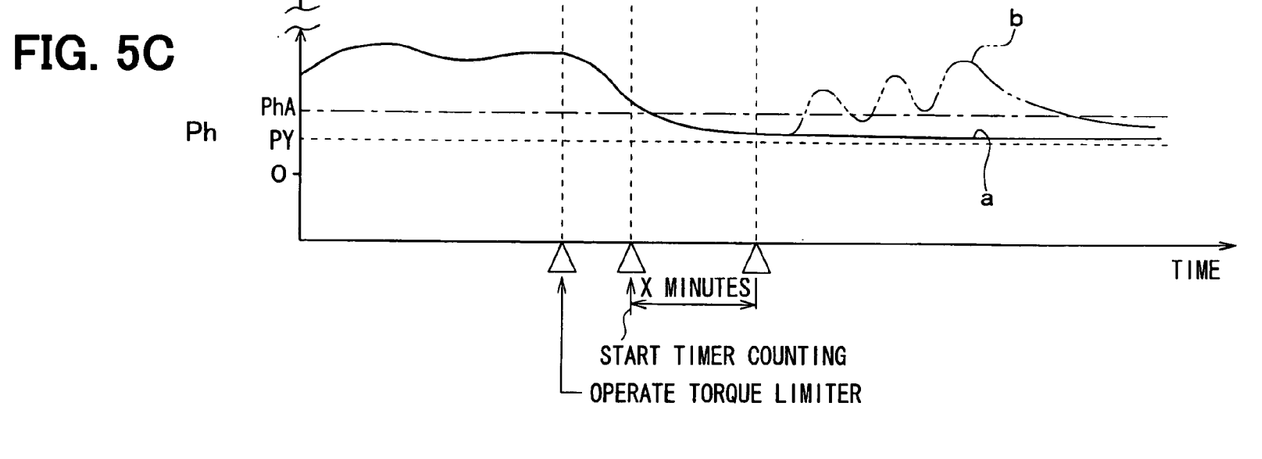

FIG. 3 is a flowchart showing the torque-limiter operation determination processing. FIG. 5A is a timing chart showing a variation in the evaporator temperature Te, FIG. 5B is a timing chart showing a variation in an output duty ratio, and FIG. 5C is a timing chart showing a variation in a refrigerant discharge pressure Ph.

In a first stage, the state of the torque limiter is determined based on the refrigerant discharge pressure Ph obtained when the duty ratio of the command signal output to the variable displacement compressor 2 (hereinafter referred to as the "output duty ratio") remains at 90% or more for X minutes or more. In a second stage, the state of the torque limiter is also determined based on a deviation of the refrigerant discharge pressure Ph obtained when commanding the variable displacement compressor 2 to change the refrigerant discharge capacity.

The details of the torque-limiter operation determination processing will be given below.

The electronic control unit 14 executes the computer program for determination of the torque limiter operation according to the flowchart of FIG. 3.

First, at step S200 shown in FIG. 3, it is determined whether or not the output duty ratio being output at the present time is not less than 90%. That is, at step S200, it is determined whether the output duty ratio being output at the present time is equal to or larger than 90%. The 90% output duty ratio corresponds to a 90% command value of the refrigerant discharge capacity.

At step S200, when the output duty ratio is below 90%, the determination is "NO". Then, the operation returns to the determination processing at step S200. When the output duty ratio is equal to or more than 90%, the determination is "YES" at step S200, and then the timer starts counting at step S210.

At step S220, it is determined whether or not the time counted by the timer is not less than X minutes. When the time counted by the timer is shorter than X minutes, the determination is "NO", and thus the operation returns to the determination processing at step S220. Thereafter, until the time counted by the timer exceeds X minutes, the determination processing at step S220 is repeated.

Thereafter, when the time counted by the timer is equal to or more than X minutes, the determination is "YES" at step S220. This means that the variable displacement compressor 2 is commanded to keep a refrigerant discharge capacity of 90% or more for X minutes or longer.

Then, at step S230, it is determined whether or not the refrigerant discharge pressure Ph is not more than a threshold PhA. The threshold PhA is a value obtained by adding a correction value APb to a refrigerant saturated pressure PY (see FIG. 4) so as to avoid an incorrect determination due to a drastic change in temperature of outside air or the like.

For example, while the torque limiter is in a non-operation state where the transmission of power from the engine 11 to the variable displacement compressor 2 is maintained, when a thermal load on the evaporator 6 in summer is large, the evaporator temperature Te can increase to deviate from the target temperature TEO.

In this case, when the output duty ratio remains at 90% or more for X minutes or longer by execution of the above-described refrigerant discharge-capacity control processing, the refrigerant discharge capacity of the variable displacement compressor 2 keeps at 90% or more for X minutes or longer. As a result, the refrigerant discharge pressure Ph is equal to or higher than the threshold PhA, and thus the determination is "NO" at step S230. Thereafter, the operation returns to step S200.

When the torque limiter is brought into an operation state where the transmission of power from the engine 11 to the variable displacement compressor 2 is interrupted at a time t0 shown in FIGS. 5A to 5C, the evaporator temperature Te increases to deviate from the target temperature TEO during the time t0 to a time t2, as shown in FIG. 5A.

In this case, the output duty ratio exceeds 90% to finally become 100% by execution of the above-described refrigerant discharge-capacity control processing, during a time t1 to the time t2 as shown in FIG. 5B. Even when the output duty ratio remains at 90% or more for X minutes or longer, the variable displacement compressor 2 does not compress the refrigerant. Thus, the refrigerant discharge pressure Ph becomes equal to or less than the threshold PhA, and the determination is "YES" at step S230.

When the amount of refrigerant charged into a refrigerant cycle in the device 1 is lacking with respect to a predefined amount while the torque limiter is in the non-operation state, the evaporator temperature Te can increase to deviate from the target temperature TEO even when the variable displacement compressor 2 compresses the refrigerant.

In this case, even when the output duty ratio remains at 90% or more for X minutes or longer by execution of the above-described refrigerant discharge-capacity control processing, the refrigerant discharge pressure Ph becomes equal to or less than the threshold PhA, and thus the determination is "YES" at step S230.

Thus, when the refrigerant charging amount is lacking with respect to the predefined amount, the determination is "YES" at step S230 even while the torque limiter is in the non-operation state, which may lead to the incorrect determination. That is, when the refrigerant charging amount is lacking with respect to the predefined amount, it cannot accurately determine whether or not the torque limiter is being operated as long as the refrigerant discharge-capacity control processing is executed.

In order to accurately determine whether or not the torque limiter is being operated, the steps following step S240 is executed as follows.

That is, at step S240, the refrigerant discharge capacity is commanded to switch from one to the other of 0% and 100% so as to change the refrigerant discharge flow amount of the variable displacement compressor 2.

Specifically, a low-capacity command TL is a command for continuously outputting a command signal indicative of the duty ratio of 0% to the control valve 15 for 10 seconds, while a high-capacity command TH is a command for continuously outputting a command signal indicative of the duty ratio of 100% to the control valve 15 for 20 seconds. The low-capacity command TL and the high-capacity command TH are alternatively switched and output.

In other words, the low-capacity command TL and the high-capacity command TH are switched and output from a low-capacity command TL(n), to a high-capacity command TH(n), to a low-capacity command TL(n+1), to a high-capacity command TH(n+1), to a low-capacity command TL(n+2), to a high-capacity command TH(n+2), and the like in that order (that is, TL(n)→TH(n)→TL(n+1)→TH(n+1)→TL(n+2)→TH(n+2) . . .). The term "n" as used herein means the number of commands.

The low-capacity command TL is one for commanding the variable displacement compressor 2 to set the refrigerant discharge capacity at a command value (e.g., 0%). The high-capacity command TH is one for commanding the variable displacement compressor 2 to set the discharge capacity at a command value (e.g., 100%).

At next step S241, a minimum value P1 of a refrigerant discharge pressure Ph when commanding the variable displacement compressor 2 to set the discharge capacity at 0% is determined. Further, a maximum value P2 of the refrigerant discharge pressure Ph when commanding the variable displacement compressor 2 to set the discharge capacity at 100% is determined.

Specifically, a low-capacity command TL(n) is set as a representative one of the low-capacity commands TL(n), TL(n+1), and TL(n+2). The minimum value P1 of the refrigerant discharge pressure Ph when outputting the low-capacity command TL(n) is determined. Further, a high-capacity command TH(n) is set as a representative one of the high-capacity commands TH(n), TH(n+1), and TH(n+2). The maximum value P2 of the refrigerant discharge pressure Ph when outputting the high-capacity command TH(n) is determined.

At next step S242, a deviation ΔP of the refrigerant discharge pressure Ph obtained when commanding the variable displacement compressor 2 to change the discharge capacity from 0% to 100% is determined. Specifically, a pressure difference ΔP (=P2−P1) between the maximum value P2 and the minimum value P1 is determined to be the deviation ΔP.

At next step S250, it is determined whether or not the deviation ΔP is below the threshold B shown in FIG. 6.

When the torque limiter is being operated, the variable displacement compressor 2 does not compress the refrigerant. Thus, the refrigerant discharge pressure Ph approaches a saturated pressure to converge on a constant value as shown in a graph "a" of FIG. 5C (after the time t2). The deviation ΔP of the discharge pressure Ph becomes below the threshold B, and thus the determination is "YES" at step S250.

In this case, at step S260, the warning lamp 17d blinks. Additionally, an outside air mode for introducing only the outside air into the vehicle compartment is set. In the outside air mode, the inside air introduction port 7a is completely closed and the outside air introduction port 7b is fully opened by the inside/outside air switching door 7c thereby to introduce only the outside air into the air conditioning case 7 that is located in the vehicle compartment. Then, an A/C switch flag is reset. Together with the reset operation, the execution of the refrigerant discharge-capacity control processing is prohibited.

In the above-described step S250, when the refrigerant is lacking with respect to the predefined amount regardless of the non-operated state of the torque limiter, the refrigerant discharge pressure Ph is varied as shown by a graph "b" after the time t2 in FIG. 5C. Thus, the deviation ΔP becomes equal to or more than the threshold B, and thus the determination is "NO".

Figure 6:
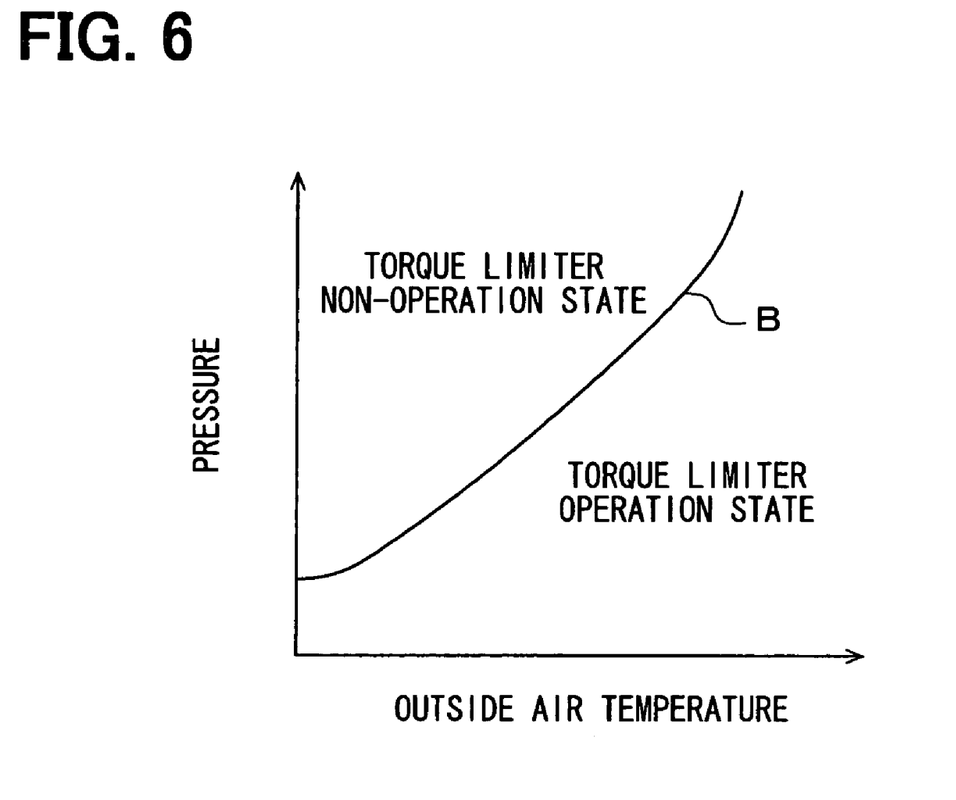
FIG. 6 is a graph showing a control map used in the control processing shown in FIG. 3.

In the present embodiment, the threshold B used in determination at step S250 is set higher as the temperature of outside air becomes high as shown in FIG. 6. FIG. 6 is a characteristic diagram showing a relationship between the threshold B (predetermined pressure B) and the outside air temperature.

As described above, in the present embodiment, whether or not the torque limiter is being operated is determined by determining whether or not the deviation ΔP of the refrigerant discharge pressure is below the predetermined pressure B when commanding the variable displacement compressor 2 to cause the electronic control unit 14 to switch the discharge capacity from 0% to 100%, and then to 0% . . . (0%→100%→0% . . .) in turn. Thus, it can be determined whether or not the torque limiter is being operated without using a compressor revolution sensor.

Figure 4:
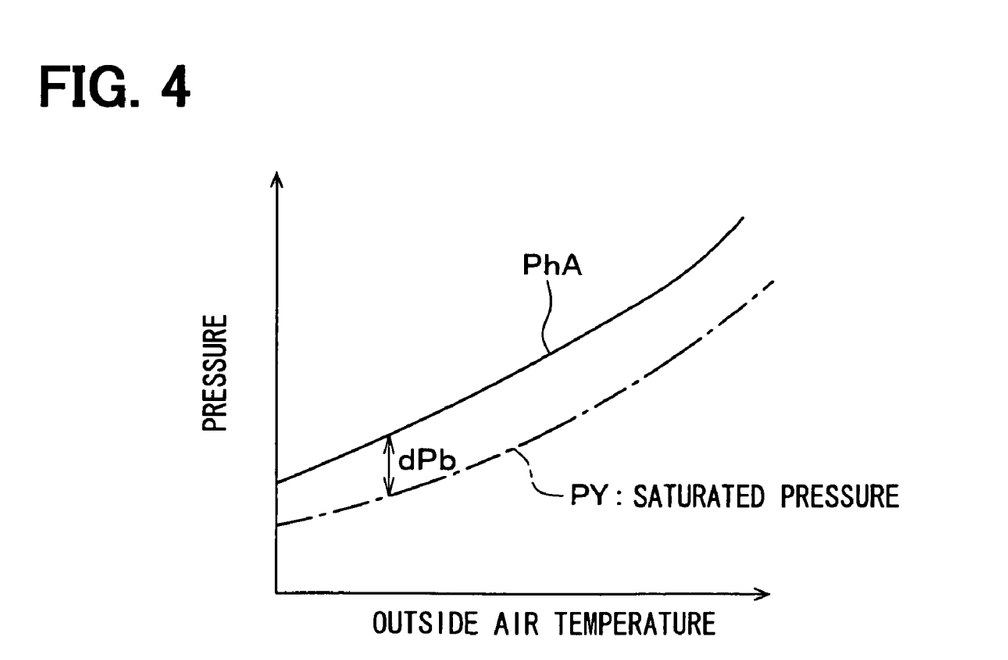
FIG. 4 is a graph showing a control map used in the control processing shown in FIG. 3.

In the present embodiment, the high-pressure refrigerant sensor 18 is disposed in the engine room as mentioned above, and thus the refrigerant discharge pressure Ph detected by the sensor 18 is affected by the temperature of the outside air. The higher the outside air temperature, the higher the saturated pressure PY of the refrigerant as shown in FIG. 4.

A threshold PhA used for determination in the above-described step S230 (refrigerant discharge pressure determination portion) is set higher as the outside air temperature becomes high. Thus, at step S230, it can be determined whether or not the refrigerant discharge pressure Ph is not more than the threshold PhA, taking into consideration a change in temperature of the outside air.

In the present embodiment, as mentioned above, the threshold B used in determination of the pressure deviation at step S250 is set higher as the outside air temperature becomes high as shown in FIG. 6. Thus, at step S250, it can be determined whether or not the deviation ΔP is below the threshold B, taking into consideration a change in temperature of the outside air.

In the present embodiment, after determining the state of the torque limiter at step S230, the state of the torque limiter is further determined at step S250. Thus, it can be accurately determined whether or not the transmission of power from the engine 11 to the variable displacement compressor 2 is interrupted by the torque limiter.

In the refrigerant discharge-capacity changing command processing at step S240 of the present embodiment, the refrigerant discharge capacity changes from 0% to 100%, and then to 0% (0%→100%→0%). Thus, the refrigerant discharge-capacity control processing at steps S100 and 110 cannot be executed in execution of the changing command processing at step S240.

The electronic control device 14 executes the refrigerant discharge capacity changing command processing at step S240 only when the determination is "YES" at step S230 because the torque limiter is determined to be being operated based on the refrigerant discharge pressure Ph. Thus, when the torque limiter is determined to be in the non-operated state based on the discharge pressure Ph, the command processing at step S240 is not executed.

The present embodiment can decrease opportunities to execute the discharge capacity changing command processing at step S240, as compared to a case in which the command processing at step S240 is performed regardless of the determination at step S230, thereby maintaining the execution of the refrigerant discharge-capacity control processing at steps S100 and S110. Thus, the air conditioning state of the interior of the vehicle compartment (i.e., passenger compartment) can be maintained as well as possible.

In the present embodiment, when the electronic control unit 14 determines that the torque limiter is being operated, the warning lamp 17d is operated to blink, so that it can warn a passenger that the torque limiter is being operated.

In general, when the variable displacement compressor 2 is driven in stopping of the vehicle, an idling engine speed is increased to ensure the power from the engine to the variable displacement compressor 2. For example, the increase in idling engine speed causes the engine 11 to waste fuel regardless of the operating state of the torque limiter.

In contrast, when the torque limiter is determined to be being operated, the increasing of the idling engine speed is prohibited so as to ensure the power from the engine to the variable displacement compressor 2, and thereby it can prevent the engine 11 from wasting the fuel.

In the present embodiment, when the torque limiter is determined to be being operated based on the deviation ΔP of the refrigerant discharge pressure, the outside air mode is set. Thus, fogging of a window glass can be prevented from occurring together with the stopping of the variable displacement compressor 2, and thereby it can ensure a good visual field of a driver via the windshield.

(other embodiments)

Although the present invention has been fully described in connection with the preferred embodiments thereof with reference to the accompanying drawings, it is to be noted that various changes and modifications will become apparent to those skilled in the art.

In the above-described embodiment, it is determined whether or not the torque limiter is being operated using the detection pressure Ph detected by the high-pressure refrigerant sensor 18, but the present invention is not limited thereto. The following modifications (1), (2), and (3) may be employed.

(1) The electronic control unit 14 may determine whether or not the torque limiter is being operated, by using a detection temperature Te detected by the evaporator temperature sensor 13.

Specifically, a minimum value P1 of the detection temperature Te when outputting the low-capacity command TL is determined, and a maximum value P2 of the detection temperature Te when outputting the high-capacity command TH is determined. A difference in temperature between the minimum value P1 and the maximum value P2 is calculated as a deviation ΔT. Whether or not the torque limiter is being operated is determined by determining whether or not the deviation ΔT is below a predetermined temperature.

(2) A flow amount sensor may be provided on a discharge side of the variable displacement compressor 2, and the electronic control unit 14 may determine whether or not the torque limiter is being operated by using the flow amount detected by the flow amount sensor.

Specifically, the minimum value P1 of the detection flow amount obtained when outputting the low-capacity command TL is determined, and the maximum value P2 of the detection flow amount obtained when outputting the high-capacity command TH is determined. The difference in flow amount between the minimum value P1 and the maximum value P2 is calculated as a deviation ΔRe. Whether or not the torque limiter is being operated is determined by determining whether or not the deviation ΔRe is below a predetermined flow amount.

The electronic control unit 14 may estimate a drive torque required for driving the variable displacement compressor 2, and it may be determined whether or not the torque limiter is being operated using the drive torque estimated.

Specifically, a minimum value P1 of the estimated drive torque when outputting the low-capacity command TL is determined, and a maximum value P2 of the estimated drive torque when outputting the high-capacity command TH is determined. A difference between the minimum value P1 and the maximum value P2 is calculated as a deviation ΔK. Whether or not the torque limiter is being operated is determined by determining whether or not the deviation ΔK is below a predetermined value.

The estimated drive torque can be generally determined based on the following mathematical formula 1:

$$T = K \cdot Ps[(Ph/Ps)^m - 1] \cdot Vc \qquad \text{formula 1}$$

in which Ph is a detection pressure detected by the high-pressure refrigerant sensor 18, and Ps is a refrigerant suction pressure of the variable displacement compressor 2. The refrigerant suction pressure Ps is estimated from the detection temperature Tc detected by the evaporator temperature sensor 13. In the formula 1, K and m are respective constants.

In the formula 1, Vc is a discharge capacity or volume of the refrigerant compressed by the variable displacement compressor 20. The discharge capacity Vc has a relationship with a refrigerant flow amount Gr, satisfying the following mathematical formula 2.

$$Vc = Gr/(Nc \cdot F) \qquad \text{formula 2}$$

in which Gr is a refrigerant flow amount in a refrigerant cycle Rc. The flow amount sensor can be provided on the discharge side of the variable displacement compressor 2 to determine the flow amount of refrigerant discharged from the variable displacement compressor 2. In the formula 2, Nc is a rotation speed of the variable displacement compressor 20. The rotation speed Nc can be determined by multiplying the engine speed detected by the engine speed sensor by a pulley ratio.

As mentioned above, whether or not the torque limiter is being operated can be determined by using the estimated drive torque without using the compressor revolution sensor.

Any other means and components except for the compressor revolution sensor may be used to determine the estimated drive torque.

Although in the above-described embodiment, the refrigeration cycle device of the present invention is applied to the air conditioner 1 for a vehicle, the present invention is not limited thereto. Alternatively, the refrigeration cycle device of the present invention may be applied to an engine-driven fixed air conditioner.

Although in the above-described embodiment, the pulley 9 is used to constitute the torque limiter, the present invention is not limited thereto. The torque limiter may have any other structure that interrupts the transmission of power from the engine 11 to the variable displacement compressor 2 when the torque from the engine 11 reaches the predetermined value, regardless of the relationship with the pulley 9.

In the above-described embodiment, the low-capacity command TL(n) is set as the representative low-capacity command TL of the low-capacity commands TL(n), TL(n+

1), and TL(n+2). The minimum value P1 of the refrigerant discharge pressure Ph of the low-capacity command TL(n) is determined. Further, the high-capacity command TH(n) is set as the representative high-capacity command TH of the high-capacity commands TH(n), TH(n+1), and TH(n+2). The maximum value P2 of the refrigerant discharge pressure Ph of the high-capacity command TH(n) is determined. The present invention is not limited thereto, and the following may be embodied.

That is, a low-capacity command other than the low-capacity command TL(n) may be set as the representative low-capacity command TL of the low-capacity commands TL(n), TL(n+1), and TL(n+2). A minimum value P1 of the discharge pressure Ph of the low-capacity command may be determined. Further, a high-capacity command other than the high-capacity command TH(n) may be set as the representative high-capacity command TH of the high-capacity commands TH(n), TH(n+1), and TH(n+2). A maximum value P2 of the discharge pressure Ph of the high-capacity command may be determined.

Alternatively, P1 and P2 may be determined as follows. That is, a minimum value of the refrigerant discharge pressure Ph in each of the low-capacity commands TL(n), TL(n+1), and TL(n+2) is determined. The average value of the minimum values of the respective low-capacity commands is determined and defined as P1. A maximum value of the refrigerant discharge pressure Ph in each of the high-capacity commands TH(n), TH(n+1), and TH(n+2) is determined. The average value of the maximum values of the respective high-capacity commands is determined and defined as P2.

Although in the above-described embodiment, the low-capacity command TL sets a command value of the refrigerant discharge capacity (a second refrigerant discharge capacity) at 0%, and the high-capacity command TH sets a command value of the refrigerant discharge capacity (a first refrigerant discharge capacity) at 100%, the present invention is not limited thereto. Alternatively, the low-capacity command TL may set a command value of the discharge capacity at 50%, and the high-capacity command TH may set a command value of the discharge capacity at 100%.

Although in the above-described embodiment, the variable displacement compressor 2 is used as a compressor, the present invention is not limited thereto. Alternatively, a fixed displacement compressor whose refrigerant discharge capacity is constant may be used. The present invention is not limited thereto, and thus any electric compressor driven by an electric motor and adapted to compress refrigerant may be used. The electric compressor has a refrigerant discharge flow amount changeable depending on the number of revolutions of the electric motor.

Although in the above-described embodiment, the duty ratio of the command signal is used for controlling the refrigerant discharge capacity for the variable displacement compressor 2, the present invention is not limited thereto. Alternatively, an electric current value of the command signal may be used. Specifically, when a command current flowing through the electromagnetic control valve 15 of the variable displacement compressor 2 changes linearly, the valve 15 changes the discharge flow amount in response to the change in current value of the command current.

In the above-described embodiment, whether or not the torque limiter is being operated is determined based on the deviation ΔP of the discharge pressure only when the torque limiter is determined to be being operated based on the discharge pressure Ph, but the present invention is not limited thereto. Alternatively, whether or not the torque limiter is being operated may be determined based on the deviation ΔP of the discharge pressure regardless of the determination based on the refrigerant discharge pressure Ph.

The correspondence relationship between the above-described embodiment and the accompanied claims will be given below. The processing at step S240 is an example of a refrigerant flow-amount changing command portion (means). The processing at step S250 is an example of a first limiter determination portion (means). The high-pressure refrigerant sensor 18 is an example of a pressure detection portion (means). The threshold PhA is an example of a predetermined pressure. The threshold B is an example of a predetermined value. Each processing at steps S241 and S242 is an example of a calculation portion (means). The evaporator temperature sensor 13 is an example of an evaporator temperature detection (means). Each processing at steps S100 and S110 constitutes a capacity control portion (means). The step S230 is an example of a second limiter determination portion (means). The warning lamp 17d is an example of a warning portion (means). The processing at step S260 is an example of a warning control portion (means).

Such changes and modifications are to be understood as being within the scope of the present invention as defined by the appended claims.

What is claimed is:

1. A refrigeration cycle device comprising:
    a compressor configured to be driven by power transmitted from an engine, so as to draw, compress, and discharge refrigerant;
    a refrigerant cooler configured to cool high-pressure refrigerant discharged from the compressor;
    a decompression device configured to decompress the refrigerant cooled by the refrigerant cooler;
    an evaporator configured to evaporate the refrigerant decompressed by the decompression device;
    a torque limiter adapted to interrupt a transmission of the power from the engine to the compressor when a torque transmitted from the engine to the compressor becomes a predetermined value;
    means for commanding the compressor to change a refrigerant discharge flow amount of the compressor;
    first means for determining whether the transmission of the power from the engine to the compressor is interrupted by the torque limiter by determining whether a deviation of a refrigerant discharge pressure of the compressor is below a predetermined pressure when the commanding means commands the compressor to change the refrigerant discharge flow amount of the compressor;
    a pressure detection portion configured to detect the refrigerant discharge pressure of the compressor,
    an evaporator temperature detection portion configured to detect a temperature of the refrigerant in the evaporator;
    means for controlling a refrigerant discharge capacity of the variable displacement compressor such that the temperature of the refrigerant detected by the evaporator temperature detection portion approaches a target temperature; and
    second means for determining whether the transmission of the power from the engine to the compressor is interrupted by the torque limiter by determining whether the refrigerant discharge pressure detected by the pressure detection portion is below the predetermined value after the controlling means controls the compressor for a certain time such that the discharge capacity of the compressor is equal to or more than the predetermined capacity; wherein
    the first determining means determines whether the deviation of the refrigerant discharge pressure of the compressor is below the predetermined pressure based on the refrigerant discharge pressure detected by the pressure detection portion;

the compressor is a variable displacement compressor configured to be capable of changing the refrigerant discharge capacity, and adapted to change the refrigerant discharge flow amount by changing the refrigerant discharge capacity;

only when the second determining means determines that the transmission of the power from the engine to the compressor is interrupted by the torque limiter, the first determining means is adapted to determine whether the transmission of the power from the engine to the compressor is interrupted by the torque limiter; and the commanding means commands the compressor to change the refrigerant discharge flow amount of the compressor, only when the second determining means determines that the refrigerant discharge pressure detected by the pressure detection portion is below the predetermined value.

2. The refrigeration cycle device according to claim 1, wherein the commanding means outputs a command signal to the variable displacement compressor, thereby commanding the compressor to change the refrigerant discharge capacity based on a duty ratio of the command signal.

3. The refrigeration cycle device according to claim 1, wherein the commanding means commands the variable displacement compressor to switch the refrigerant discharge capacity of the compressor from one to the other of a first refrigerant discharge capacity and a second refrigerant discharge capacity which is below the first discharge capacity.

4. The refrigeration cycle device according to claim 3, further comprising means for calculating and determining a maximum value of the detection pressure detected by the pressure detection portion obtained when the commanding means commands the compressor to set the first refrigerant discharge capacity as the refrigerant discharge capacity, and a minimum value of the detection pressure detected by the pressure detection portion when the commanding means commands the compressor to set the second refrigerant discharge capacity as the refrigerant discharge capacity, the calculating means being further adapted to calculate a difference between the maximum value and the minimum value as the deviation of the refrigerant discharge pressure, wherein the first determining means determines whether the deviation is below the predetermined pressure by using the deviation calculated by the calculation means.

5. The refrigeration cycle device according to claim 1, wherein the first determining means is adapted to determine whether the deviation of the refrigerant discharge pressure of the compressor is below the predetermined value by determining whether a deviation of the detection temperature detected by the evaporator temperature detection portion is below a predetermined temperature when the commanding means commands the compressor to change the refrigerant discharge flow amount of the compressor.

6. The refrigeration cycle device according to claim 1, further comprising means for estimating a drive torque required for driving the compressor, wherein the first determining means is adapted to determine whether the deviation of the refrigerant discharge pressure of the compressor is below the predetermined value by determining whether the deviation of the drive torque estimated by the estimating means is below a predetermined torque when the commanding means commands the compressor to change the refrigerant discharge flow amount of the compressor.

7. The refrigeration cycle device according to claim 1, further comprising a flow amount sensor configured to detect the refrigerant discharge flow amount of the compressor, wherein the first determining means is adapted to determine whether the deviation of the refrigerant discharge pressure of the compressor is below the predetermined value by determining whether the flow amount detected by the flow amount sensor is below a predetermined flow amount when the commanding means commands the compressor to change the refrigerant discharge flow amount of the compressor.

8. An air conditioner for a vehicle, comprising the refrigeration cycle device according to claim 1, the compressor being driven by the engine for vehicle running, the air conditioner comprising:

an air conditioning case defining an air passage through which air flows toward an interior of a vehicle compartment, the air conditioning case being adapted to accommodate the evaporator in the air passage; and a blower configured to blow the air toward the evaporator in the air conditioning case.

9. The air conditioner for a vehicle according to claim 8, further comprising:

a warning portion configured to warn a passenger in the vehicle compartment; and means for warning the passenger by operating the warning portion that the transmission of power from the engine to the compressor is interrupted by the torque limiter, when the first determining means determines that the transmission of the power from the engine to the compressor is interrupted by the torque limiter.

\* \* \* \* \*